Figure 1:
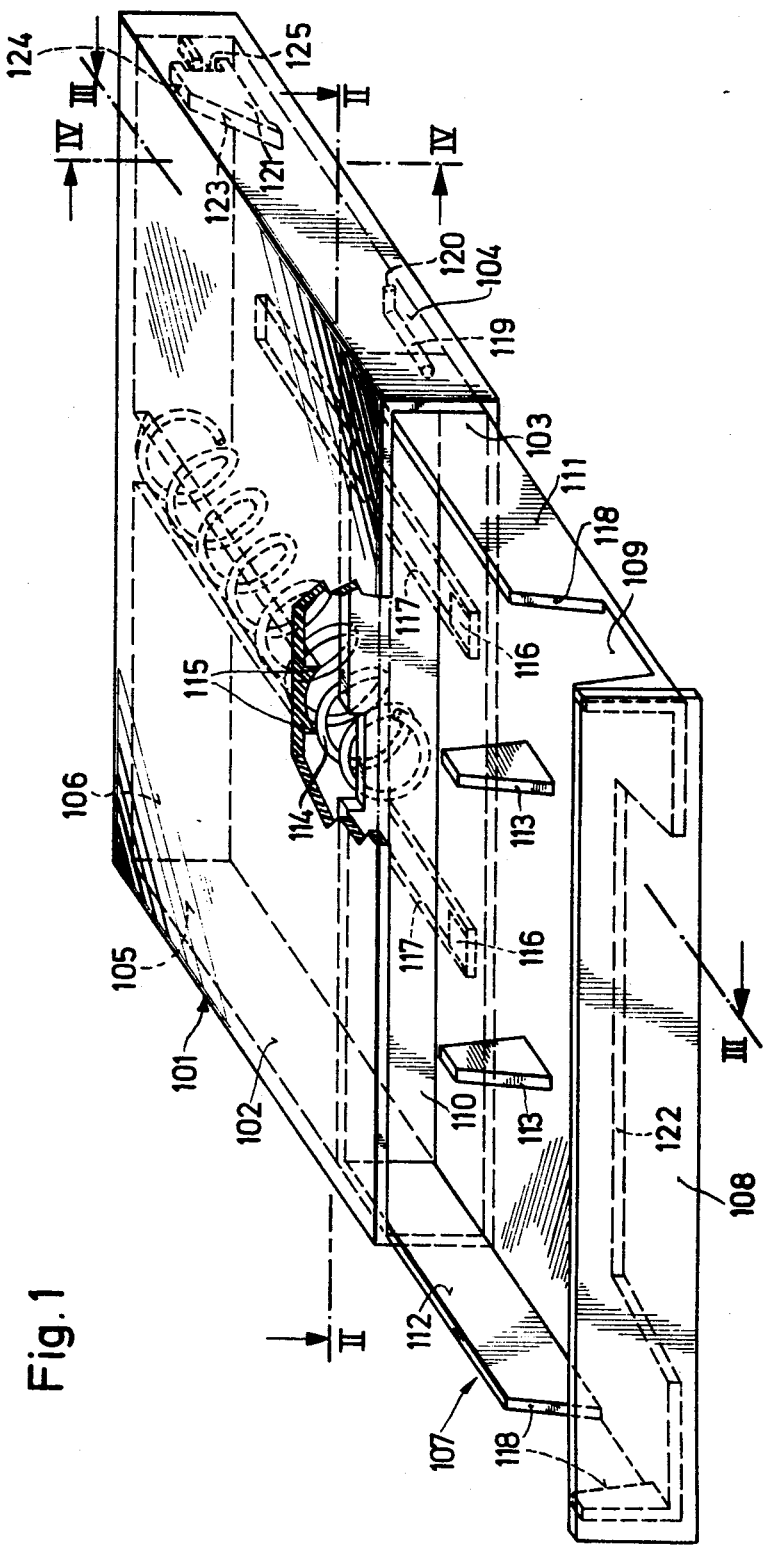

United States Patent [19]

Ackeret

[11] 4,046,255
[45] Sept. 6, 1977

[54] CONTAINER FOR STANDARD MAGNETIC TAPE CASSETTE

[75] Inventor: Peter Ackeret, Kusnacht, Switzerland

[73] Assignee: IDN Inventions and Development of Novelties AG, Lenzerheide, Switzerland

[21] Appl. No.: 634,622

[22] Filed: Nov. 24, 1975

[30] Foreign Application Priority Data

May 14, 1975 Germany .............................. 2521371

[51] Int. Cl.² .............................................. B65D 85/672
[52] U.S. Cl. ......................................... 206/387; 206/1.5;
312/319; 312/345; 312/349; 312/350
[58] Field of Search ................. 206/1.5; 312/387, 10,
312/15, 16, 111, 319, 345, 349, 350, DIG. 15

[56] References Cited

U.S. PATENT DOCUMENTS

| | | | |
|---|---|---|---|
| 3,586,010 | 6/1971 | Landen | 206/1.5 |
| 3,592,521 | 7/1971 | Cox | 312/319 |
| 3,642,337 | 2/1972 | Manheim | 312/111 |
| 3,716,279 | 2/1973 | Anderson et al. | 312/349 |
| 3,809,219 | 5/1974 | Esashi | 206/1.5 |
| 3,828,922 | 8/1974 | Holkestad | 206/1.5 |
| 3,836,222 | 9/1974 | Kuntze | 312/319 |
| 3,883,205 | 5/1975 | Ambaum et al. | 312/350 |
| 3,904,259 | 9/1975 | Hoffmann et al. | 312/319 |
| 3,978,985 | 9/1976 | Zinnbauer | 206/387 |

*Primary Examiner*—William Price
*Assistant Examiner*—Bruce H. Bernstein
*Attorney, Agent, or Firm*—H. Dale Palmatier

[57] ABSTRACT

A container for tape cassettes of the type which have broad flat surfaces adjoining a longitudinal edge through which the tape is exposed; and wherein the cassette has broad rib-like trapezoidal bosses on each of the broad flat surfaces of the cassette; a container for such cassettes with a slide to carry the cassette into and out of the housing, the bottom wall, whether it be on the housing or the slide, having an opening to receive the trapezoidal boss of the cassette; and the top wall may also have an opening to receive the adjacent trapezoidal boss of the cassette; the carrier slide having guiding means at its opposite sides to guide with the housing at a location outwardly beyond the ends of the bosses on the cassette.

9 Claims, 13 Drawing Figures

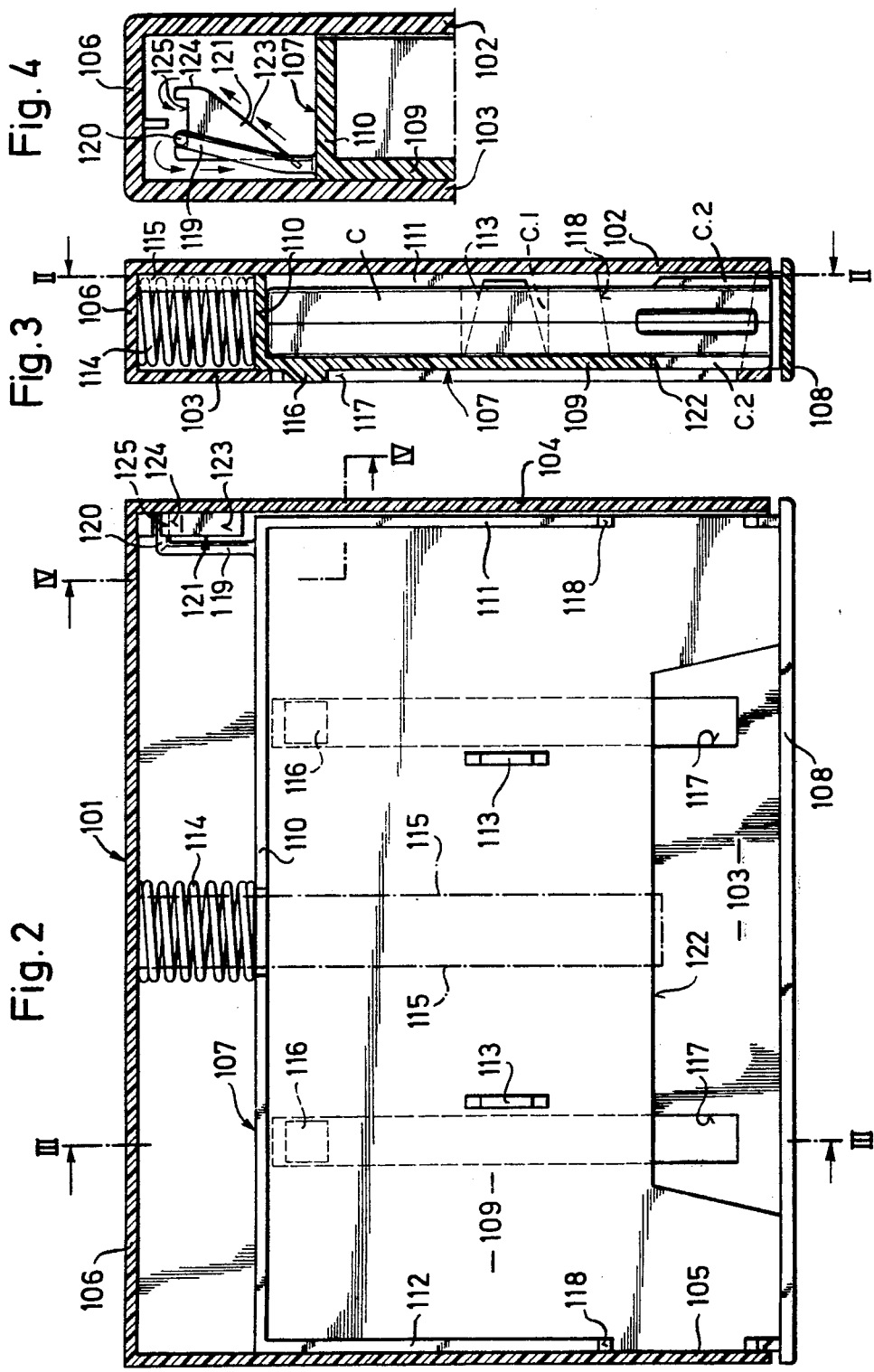

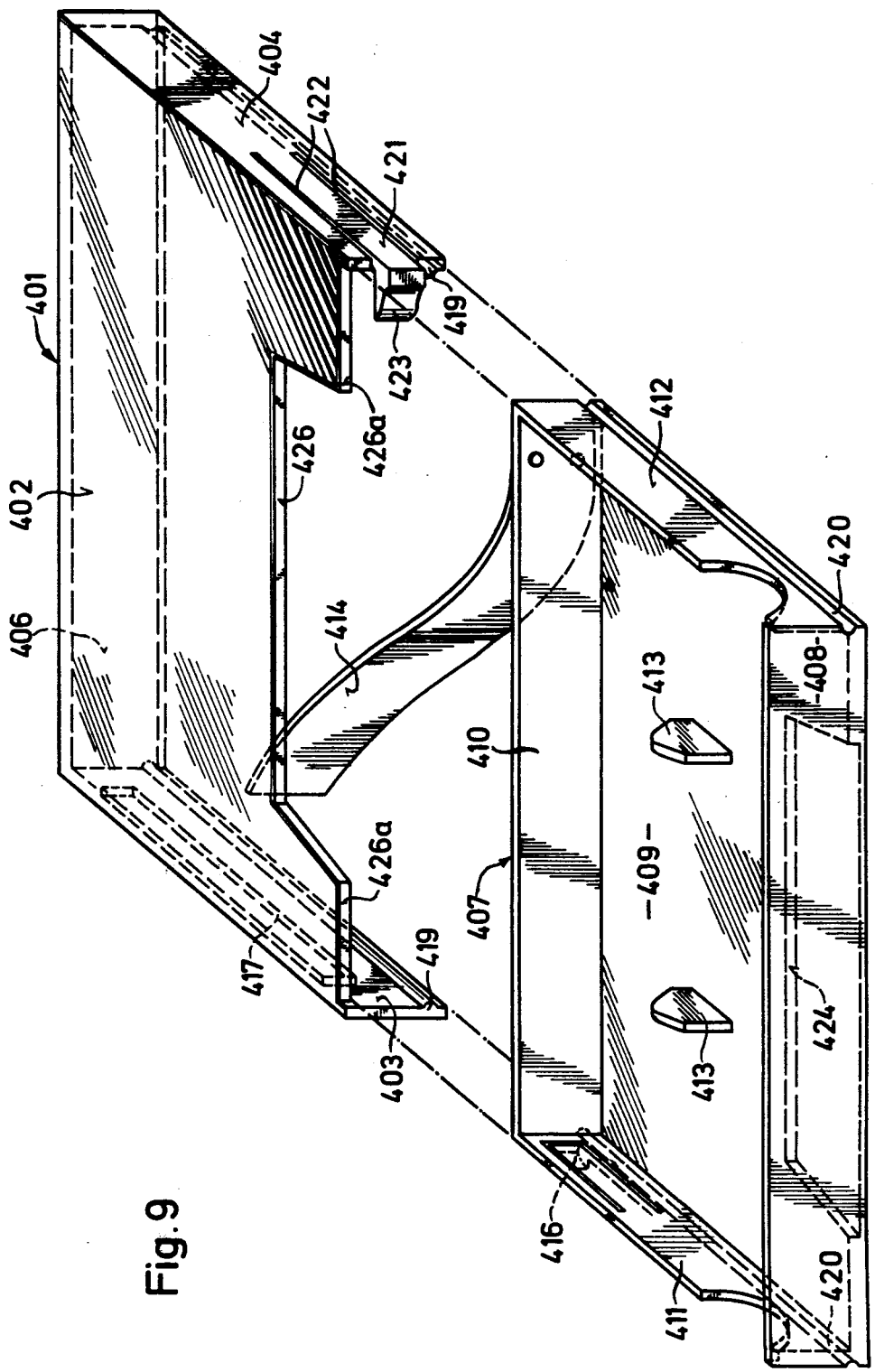

CONTAINER FOR STANDARD MAGNETIC TAPE CASSETTE

As is known, in tape recorders in the field of entertainment electronics sales of the cassette type machine have increased substantially since manufacturers have agreed on a uniform design of the cassette. This widely available cassette will be referred to hereinafter as "standard magnetic tape cassette" or, for short, "cassette". This cassette is substantially a parallelepiped in shape but on the upper and under sides there thicker section broad which are elongate bosses approximately trapezoidal in shape and adjoin from the longitudinal edge of the cassette where the magnetic tape is exposed or "open". On the market, cassettes of this kind are offered for sale in different sorts of packages in most cases made of a plastics material. Containers for accomodating cassettes are also known. German Patent Specification No. 22 48 408 describes a container for this purpose which may also be stacked.

The known container consists of a housing with five walls, while one longer narrower side is open. In the housing there is arranged a carrier slide having a front plate against which the "open" longitudinal edge of the cassette lies. Into the housing there extends a supporting surface for the cassette which carries projections over which the cores of the tape reels of the cassette are placed. The supporting surface, in turn, has guide grooves which co-operate with guide rails shaped in a complementary manner and which project inwards from the base of the housing.

A spring is tensioned between the rear wall of the housing and a rear plate of the slide. If the slide is pushed into the housing then the spring is tensioned. The slide is held in the housing by means of a locking arrangement which may be released manually. When release is effected the spring pushes the slide outwards until it is in an open position, the movement being restricted by a stop arrangement. In the open position the cassette may be inserted and removed. A number of similar containers may be stacked up into blocks of containers using groove and spring combinations.

Although prior types of container are very easy to manipulate they have the disadvantage that the space required for a number of containers is unnecessarily large. The internal dimensions of the container are co-ordinated with the thickness of the cassette in the region of the thickness area on the cassette, and the appropriate external dimension of the container is calculated by adding to this internal dimension, the thickness of the supporting surface of the carrier slide, the thickness of the guide rail, the thickness of the cover of the housing and finally the thickness of the base of the housing.

It is an object of the present invention to provide a container for accommodating a standard magnetic tape cassette in which the thickness measurement discussed above is reduced.

The container has at least three walls, that is, one lying facing the top or base of the cassette upper or underside and two side walls, and which also includes a carrier slide having a front to protect the longitudinal edge of the cassette and a supporting surface which faces the under or upper side of the cassette. Guide means are provided for the sliding movement of the carrier slide from a closed position, in which the carrier slide is held in the housing by means of a locking arrangement which may be released manually, into an open position by the force of a resilient arrangement which is stressed when the slide moves into the container.

The guide means for the carrier slide is displaced from the thickest area of the cassette to those areas where the cassette has no thicker section.

Further, the parts of the container lying in each case against the relative upper and/or lower side of the cassette are guided over the front plate or the carrier slide almost as tightly as a skin right up to these areas until there is adequate freedom of play for the cassette to be taken out, but at those points where the thicker sections occur, these parts "hug" the thickenings in a complementary manner, or are broken away so that finally there can be produced a container in which the thicker sections are free on both sides and the thickness of which container is only larger than the cassette in the area of the thickenings by such an amount that when a stock is constructed from several cassettes, the cassettes lying directly adjacent to each other do not rub against each other in the region of their thicker sections.

Figure 5:
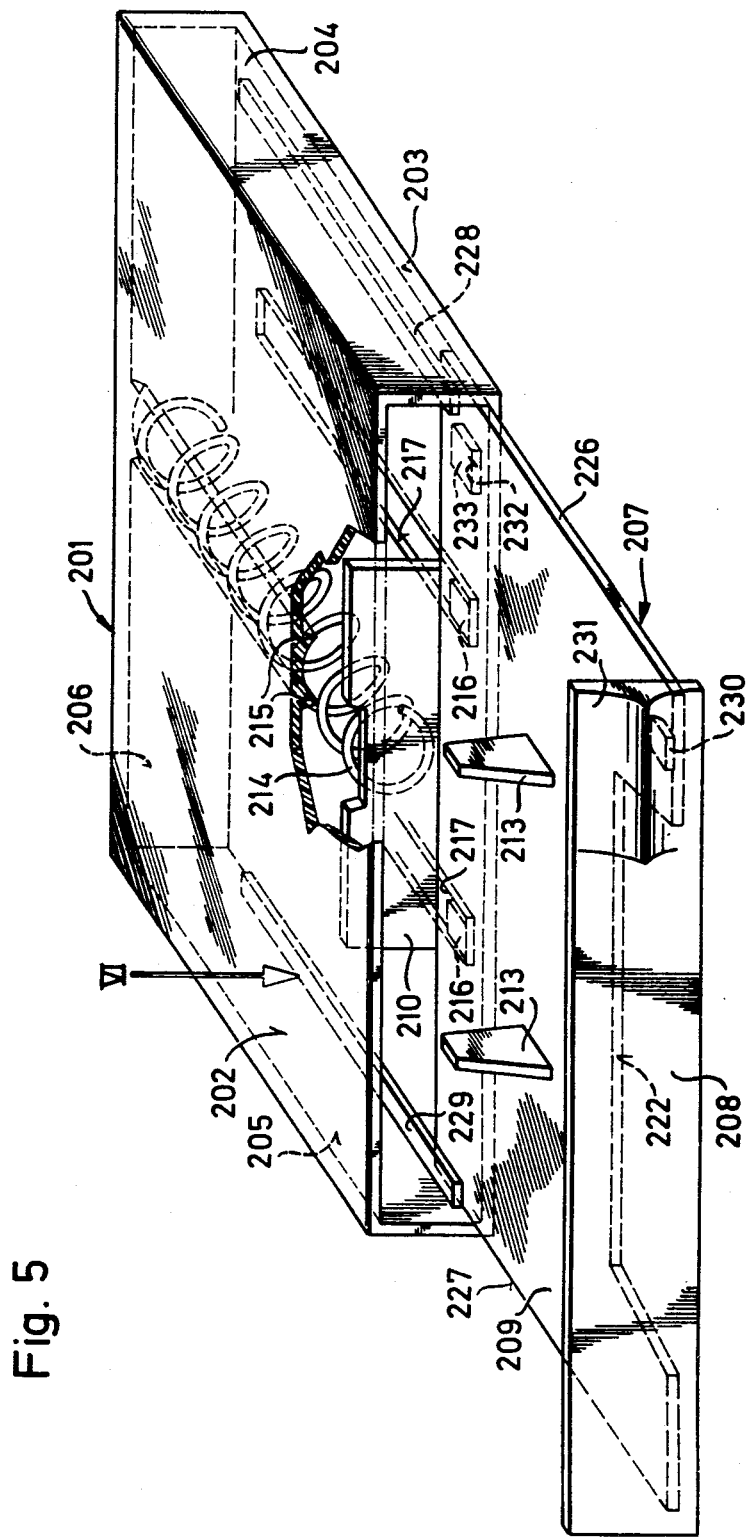
Figure 6:
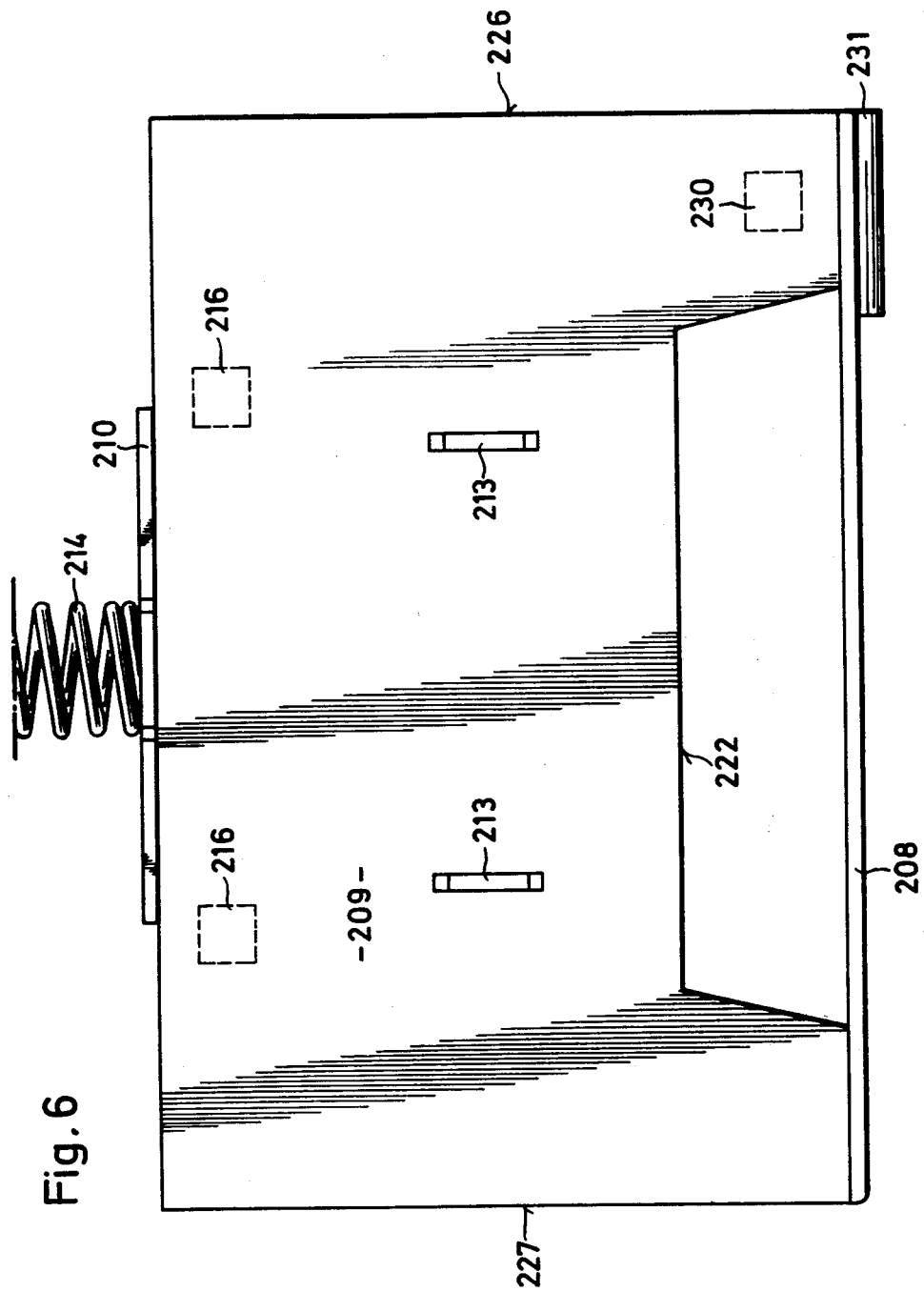
Figure 7:
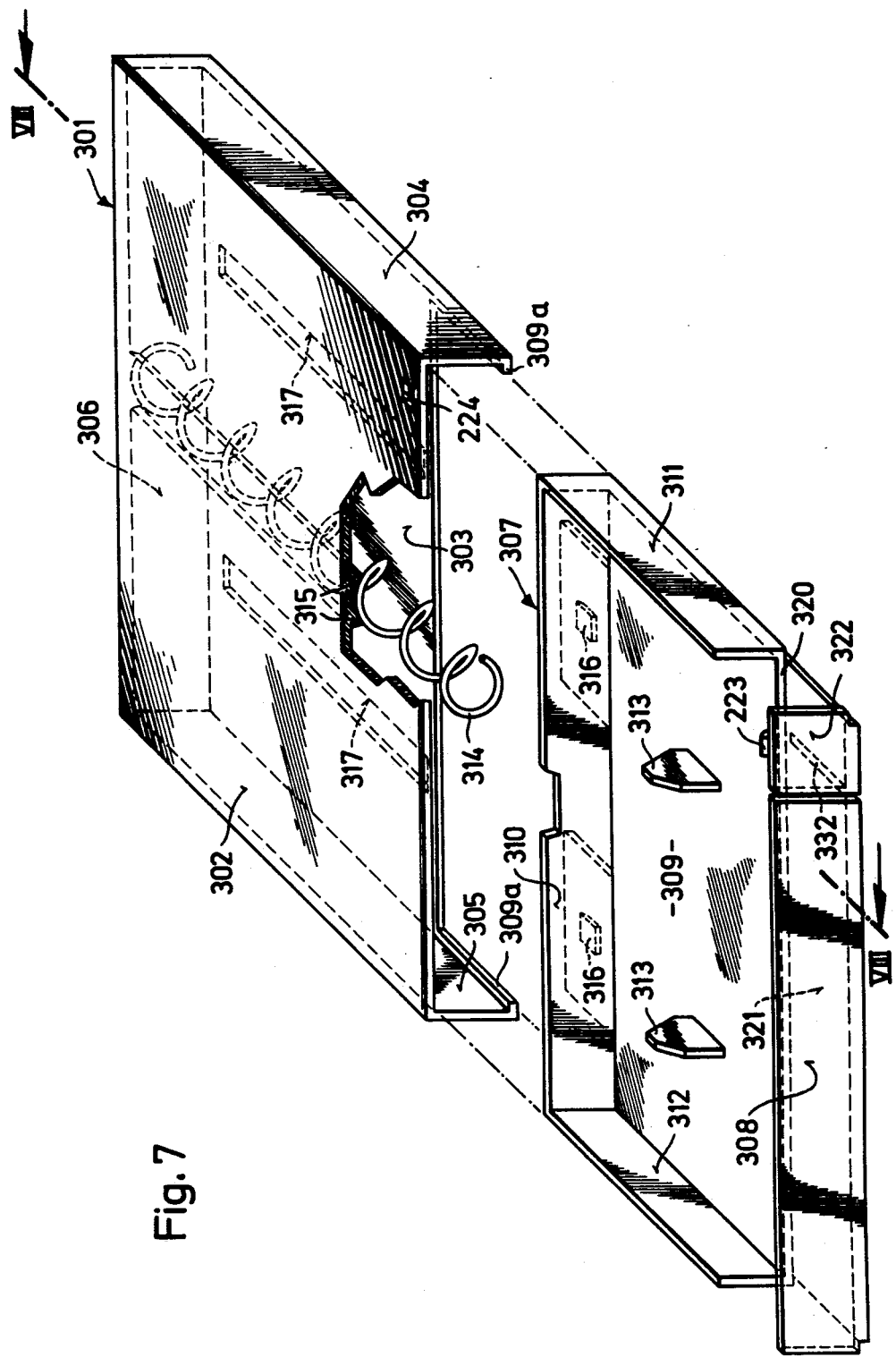
Figures 8, 8A:
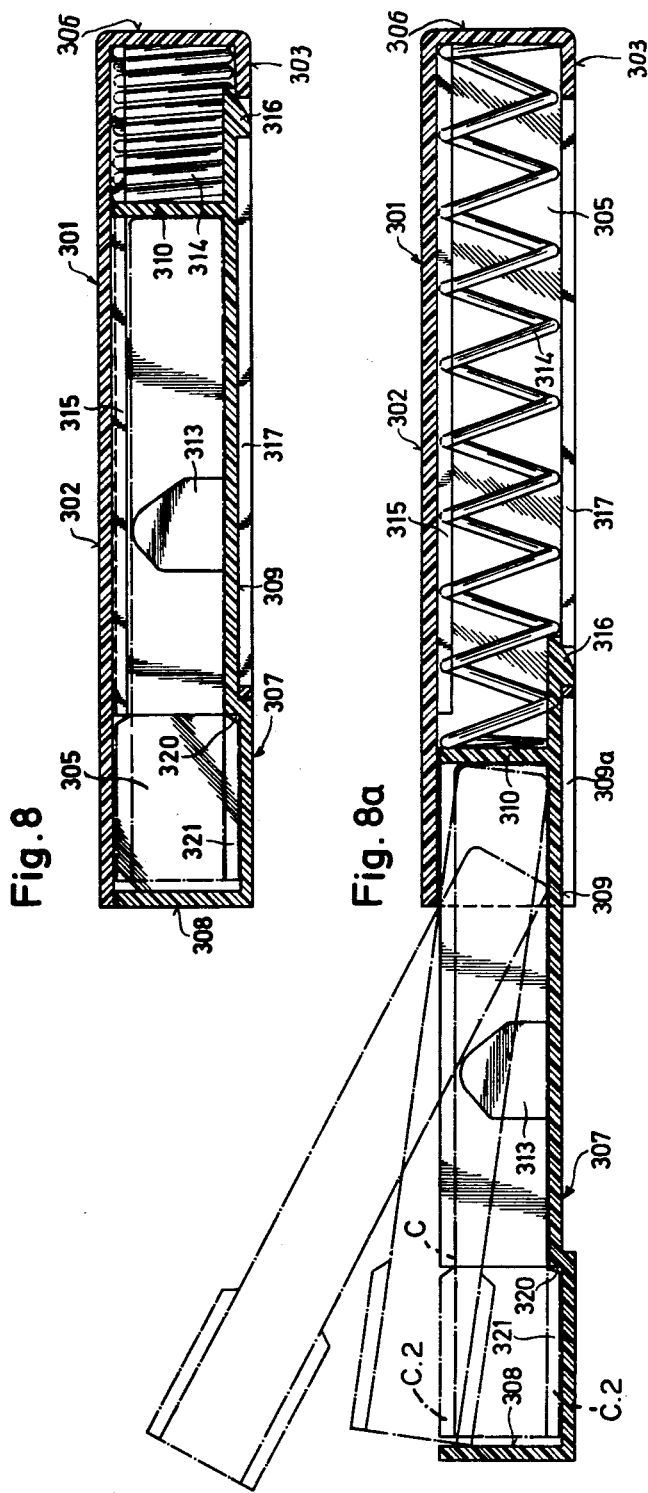
Figure 10:
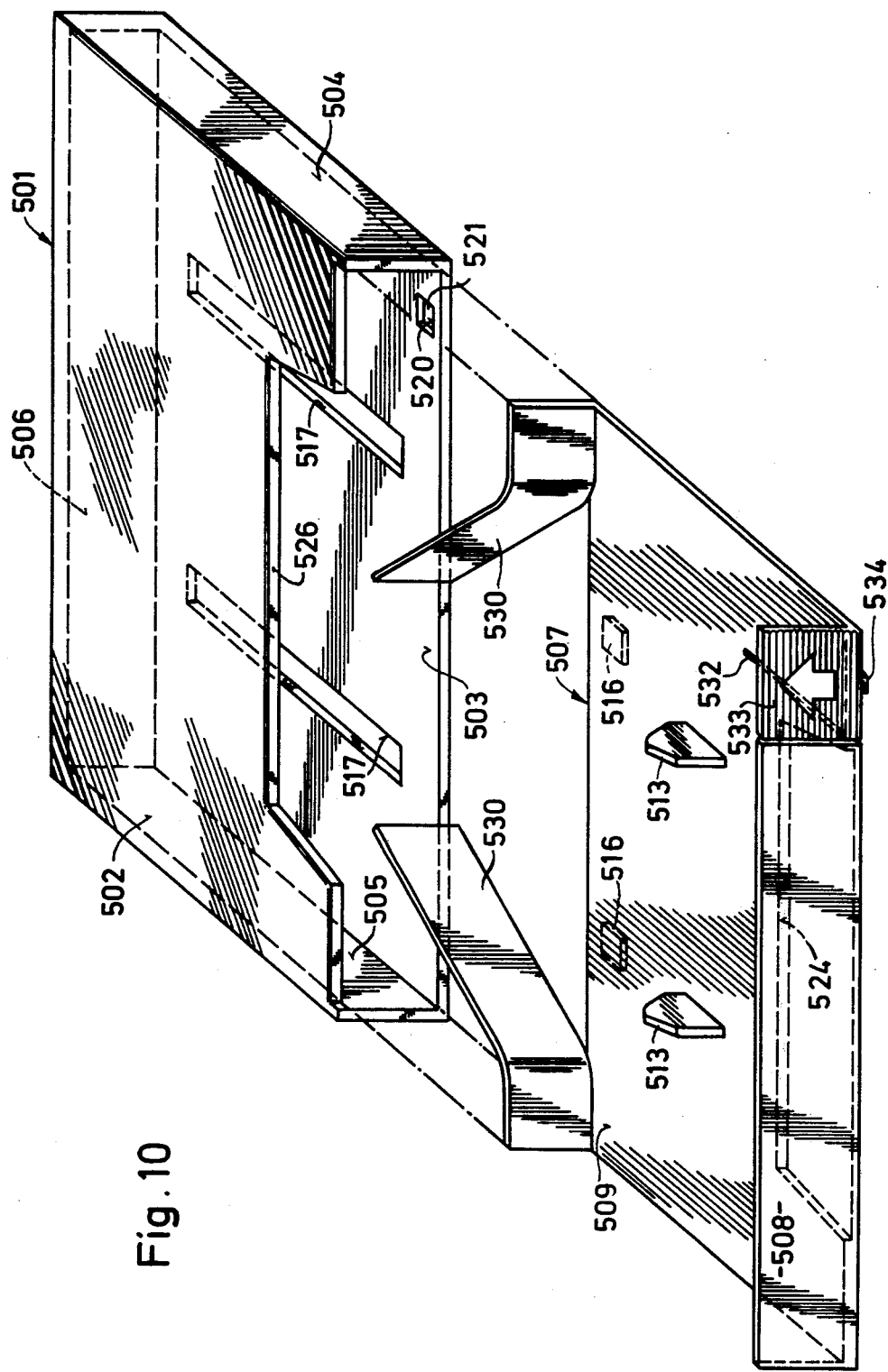
Figure 11:
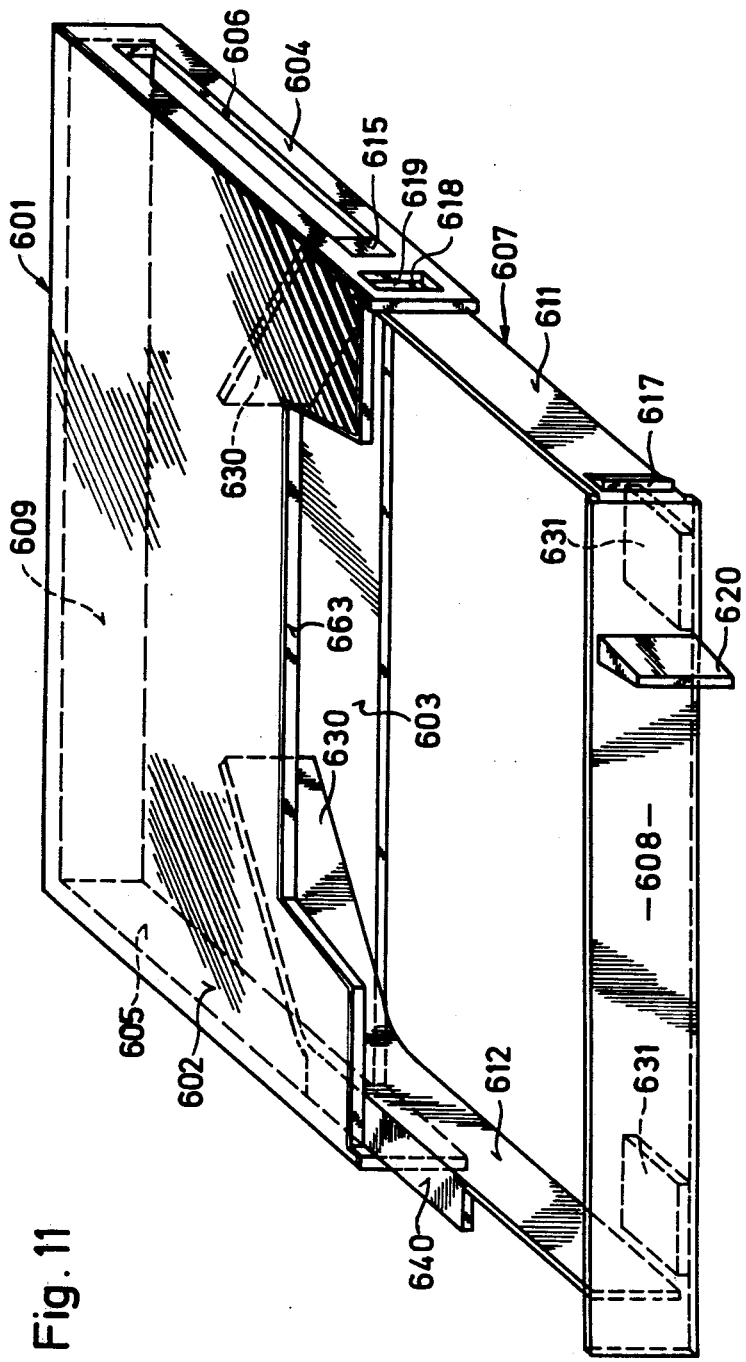
Figure 12:
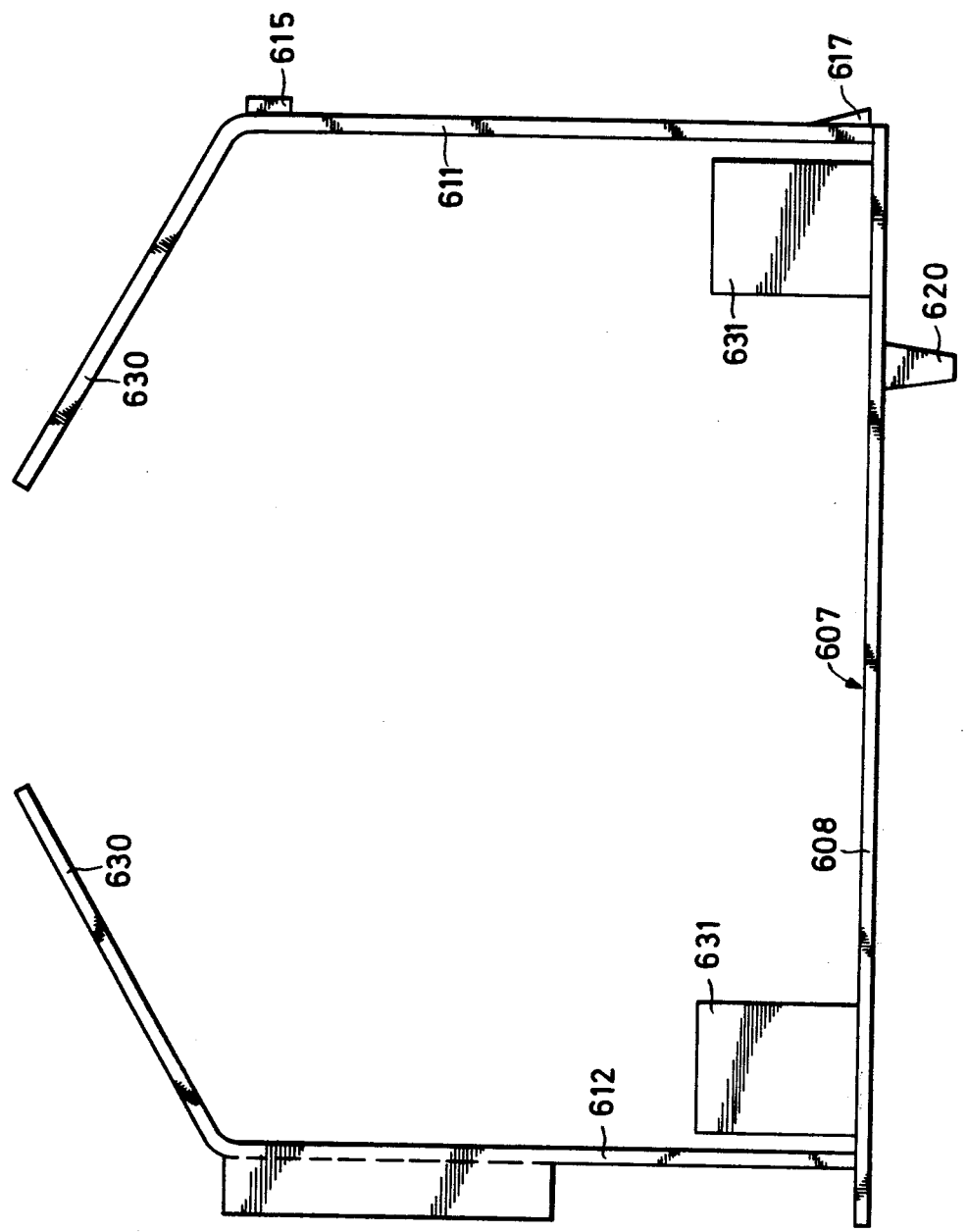

By way of example only, embodiments of the invention will now be described with reference to the accompanying drawings of which:

FIG. 1 is a perspective view of a first embodiment part of the surface being cut away, FIG. 2 is a section on the line II—II of FIGS. 1 and 3, FIG. 3 is a section on the line III—III of FIGS. 1 and 2, FIG. 4 is a section on the line IV—IV of FIGS. 1 and 2, FIG. 5 is a perspective view of a second embodiment, part of the surface being cut away, FIG. 6 is a detail plan view of the slide and spring in the direction of arrow 6 in FIG. 5, FIG. 7 is a perspective view of a third embodiment, part of the surface being cut away, and wherein the dot-dash lines show the alignment for assembly, FIG. 8 is a section on the line VIII—VIII of FIG. 7, and showing the container closed, FIG. 8a is a section similar to FIG. 8 but with certain parts in a different position, FIG. 9 is a perspective view of a fourth embodiment, FIG. 10 is a perspective view of a fifth embodiment, FIG. 11 is a perspective view of a sixth embodiment, and FIG. 12 is a plan view of a component of the embodiment shown in FIG. 11.

FIG. 1 is a perspective view of a first embodiment of the invention. The embodiment comprises a container having a housing 101 which is a parallelepiped having a top wall 102, a base plate or bottom wall 103, side walls 104 and 105, respectively, an open front and a rear wall 106.

In the housing 101, a carrier slide 107 is movably guided and consists of front wall 108, base or bottom wall 109, rear 110 and sides 111, 112. The base 109 supports two uprights or lugs 113 on to which tape reel cores C.1 of a cassette C (see FIG. 3) may be placed. A spiral spring 114 is located between the rear wall 106 of the housing and the rear 110 of the slide and is constrained from flexing sideways by ribs 115 which are disposed on the inner side of the top wall 102 of the housing. Stops to limit the outward movement of the slide are provided on the base surface thereof by two projections 116 which engage in slots 117 in the base wall 104 of the housing. The sides 111, 112 have notches 118 so that it is easy to grip the cassette without inhibiting the guiding function of these sides. From the rear 110 of the slide there projects a spring arm 119 with an angled end 120, while on the side wall 104 of the housing a rocker arm 121 is disposed. The base of the slide 107 has an elongate trapezoidally shaped opening 122 which is substantially the same size and shape as the trapezoidally shaped thicker section or bosses C.2 of the cassette C. FIG. 3 shows that in this manner the thickness of the housing is equal to the maxium thickness of the cassette, increased in this area by the very thin sections of the top and base 102 and 104, respectively, of the housing.

The housing and slide are made of a plastics material and are preferably produced by injection-moulding processes. Although in the embodiment shown in FIGS. 1-4, the spring arm 119 is of metal, it could alternatively be made of a plastics material and could then be shaped simultaneously with the slide.

To insert a cassette into the housing the tape reel cores are placed on the uprights 113 and the front 108 of the slide is subjected to pressure to move the slide into the housing 101. During movement, the slide is guided by the sides 111 and 112 moving between the top wall 102 and base wall 103 and along side walls 104 and 105, and the spring 114 is compressed. In the last part of the movement of the slide the end 120 of the spring arm 119 strikes against the inclined surface 123 of the rocker arm 121 and is deflected upwards, after which it slides it slides over the step 124 of the rocker arm and snaps downwards againt the rear edge of a U-shaped slot 125.

If the pressure on the front 108 of the slide is now reduced, the spiral spring 114 pushes the slide forward but this movement is limited by the spring arm end 120 which is located in the U-shaped slot 125 of the rocker arm 121. To remove the cassette, pressure is again exerted on the front 108 so that the end 120 of the spring arm disengages the end of the U-shaped slot 125 of the rocker arm 121 and slides down and outwards. The spiral spring 114 is now able to push the slide outwards into the position shown in FIG. 1, once the front 108 is released. The spring arm 119 being deflected somewhat downwards when its end 120 slides along underneath the inclined surface 123. FIG. 4 shows the position of the spring arm in the locked position.

The embodiment shown in FIGS. 5 and 6 again comprises a housing 201 with top and a base or bottom walls 202, 203 respectively, side walls 204, 205, rear wall 206, and also a carrier slide 207. The slide comprises a front 208 with a base 209 secured at right angles to the front 208. As in the first embodiment, the base carrier two projections 213, on the which the cores of the tape reels of the cassette (not illustrated) may be placed. Furthermore, the slide 207 has a rudimentary upright rear panel 210, against which a sprial spring 214 acts. The sprial spring 214 is contrained against flexing by ribs 215. Slots 217 co-operate with projections 216 to limit outward movement of the slide 207.

The rear 210 has a cut-away section in the area around the ribs 215. The base 209 of the slide also has an opening 222 which matches the shape and dimensions of the thicker section of the cassette C. The guide means for the slide are disposed at a location spaced transversely, relative to the direction of movement of the slide, from the opening 222 to accommodate the thicker section of the cassette. The outer edges 226 and 227 of the base 209 are each guided in a groove formed between ridges ribs 228 and 229 and the base wall 203. The ribs 228 and 229 are on the side walls 204 and 205 respectively. The ribs 228 is spaced at a greater distance from the base wall 203 than is the ridge 229, although the base 209 of the slide is of a uniform thickness. The reason for the this lies in the type of slide locking used in this second embodiment. Next to the edge 226 and in the groove below the rib 228 and the base 209 has a locking lug 230 pointing downwards and on the outside of the front plate there is a shaped lifting lug 231. When the slide is fully home, the projection 230 engages behind the locking edge 232 of an opening 233 provided in the base wall 203 and thus holds the slide in a fully home, locked position.

To open the container it is unlocked by pressing lightly upwardly against the lug 231. Since the edge 226 has a certain amount of play within the groove, the slide is lifted up by an amount sufficient to disengage the lug 230 from the locking edge 232. In contrast, the groove beneath the ridge 229 is so dimensioned that the edge region 227 is accurately guided and does not jam.

The embodiment shown in FIG. 7 comprises a housing 301 with top wall 302, base wall 303, side walls 304 and 305, a rear wall 306 and carrier slide 307 having a front 308 and a rear 310.

The spiral spring 314 corresponds with the spring 114 of the first embodiment and is guided in a similar manner. Slots 317 with co-acting projections 316 are again provided as stop arrangement to limit outward movement of the slide. Furthermore, sides 311 and 312 of the slide serve to guide the slide in conjunction and ledges 309a and top wall 302.

The base wall 303 is of shorter length than the top wall 302 to accommodate the stepped bottom wall or base 309 of the slide. The base 309 of the slide 307 is of a length equal to that of the base wall 303 and has an extension to which the front 308 of the slide is joined. The extension is stepped downward at 320 with respect to the base 309. In this way, there is formed a recess or opening 312 to receive the thicker section of the cassette. A catch 322 is separated from the front 308 and the extension by a slot 332 and has on its upper side a projection 223 with which there is associated a locking edge 224 in the top wall 302 of the housing.

As in the case of the previous embodiments, the housing and the slide of the embodiment of FIGS. 7, 8, 8a are in each case injection-moulded parts of a plastic material each formed in one piece. The position of the cassette in the containers is shown in FIG. 8. The functions of opening and closing of the container will be evident to the person or ordinary skill from the above explanation. The removal of the cassette is shown in FIG. 8a at three different stages each shown by broken lines. The ledges 309a also prevent the slide from tipping.

It should be noted that in the previously described embodiments the base of the carrier slide lies closely against the surface of the cassette, where this is not of the thicker section. In the area of the thicker section or trapezoidal boss C.2 of the cassette C, the base is of a stepped profile of the base plate to accommodate that section. However, on the opposite side, the housing wall does not lie directly against the less thicker section of the cassette, bacause it is necessary to provide space for the guide ribs which prevent the sprial spring from flexing sideways. This may be seen most clearly from FIG. 3. As a result, although the container is reduced by a wall thickness of the housing or of the slide with respect to the known construction and also additionally by the thickness of the guide means which is present in the area of the thicker section of the cassette, it will be shown that it is possible to reduce the thickness even further.

In the fourth embodiment, shown in perspective in FIG. 9, both faces of the containers, which lie closely against the thinner part of the cassette have a free or open space to receive the thicker section of the cassette.

This container comprises a housing 401 with a top wall 402, a rear wall 406 and side walls 403, 404. A base wall is not provided. The carrier slide 407 has a front 408, a base 409, a rear 410 and sides 411, 412, which impart a drawer-like configuration to the slide. The base 409 carries the usual projections 413. To the rear plate 410 there is secured by, for example rivetting, a flat spring 414, which is stressed inside the housing 401 against the rear wall 406 thereof. To guide the slide in the housing each side 411, 412 of the slide has a guide groove 420 which is associated with a corresponding guide rib 419 on the inner side of the corresponding side walls 403 and 404 of the housing. A slot 417 in one or both side walls 403, 404 forms a limit stop arrangement with a corresponding projection 416 on the side plate/plates 411/412, the function of this stop arrangement being obvious. A locking tongue 421 with a catch 423 serves as the locking mechanism. The tongue may be deflected resiliently from the side wall 403 because of incisions 422. In its relaxed state, the catch 423 engages the outer side of the front 408.

Both the base 409 of the slide 407 and the top wall 402 of the housing 401 have openings 426 and 424 respectively to accommodate the thicker section of the cassette. There is thus an openings 424 in the base 409 of the slide 407 and a slot or a notch 426 in wall 402 of the housing. When the slide is fully home within the housing, the cassette is protected at its most sensitive points, that is, in the area of the cores of the tape reels and in the area of the front side which lies on the inside against the front 408. The front 408 engages the edges 426a appropriately set back, of the wall 402. The thicker sections of the cassette are free and the total thickness of the container need not be any larger than that of the cassette in this area. However, if it is desired to stack the cassette containers, which is frequently the case, then the thickness with be selected to be one or two tenths of a millimetre larger so that the thickened areas of the cassette do not lie directly adjacent. The stacking of the individual containers is known.

Similar cut-aways 524 and 526 are also provided in the embodiment shown in FIG. 10. In place of the flat spring 414 in the fourth embodiment just described, there are arranged two resilient tongues 530 extending inwardly from the rear plate of the carrier slide 507. The resilient tongues 530 have the same function as the flat spring 414, namely, to push the slide out of the closed position in the housing 501 into the open position. The slide is guided in the housing in a manner analogous to that described in FIGS. 5 and 6. The locking mechanism lies outside the area of greaters thickness of the cassette, as in the case of all the other embodiments. A catch 533 with a projection 534 on the base is separated by the slot 532, the housing having a corresponding recess 521 with a locking edge 520. Projections 516 limit the movement of the slide in conjuction with slots 517 in the base 509. The reference numerals 501–509, and 513 identify components that correspond to those components with the same final numbers in the previous embodiments.

FIGS. 11 and 12 show an embodiment in which the carrier slide 607 consists of an open frame only, the frame having a front 608, sides 611, 612, resilient arms 630 in place of a rear (as in the fifth embodiment) and also two tabs 631 which are arranged at right angles to the front inside the slide and support the cassette outside its thickened areas. The carrier slide is rigid enough to be guided by the housing 601. The housing also is cut away as at 633 which limits the free space for the thicker section of the cassette. The housing has top and base walls 602, and 603 respectively, side walls 604 and 605 and a rear wall 609.

As a stop arrangement the side wall 604 of the housing has a slot 606 in which a projection 615 on the side 611 of the slide is guided. For the purpose of locking the slide in the housing this side 611 carries a projection 617 which is associated with a locking edge 618 in an opening 619 of the side wall 604. To release the locking mechanism the catch 620 is pushed with a finger to the left (according to FIG. 12 which shows the slide in plan view), so that the entire slide is tilted in the housing and the projection 617 disengages the opening. The space required for the tilting is provided by making the housing 601 somewhat wider than the distance between the side plates 611, 612 of the slide; however, in this the left-hand side plate 612 has an angular supporting surface 640 which does not quite extend as far as the front plate 608.

As provided in all the other embodiments, the housing and slide of the embodiment shown in FIGS. 11 and 12 are made of plastic material and are preferably one-piece injection-moulded parts.

I claim:

1. A container for accommodating a standard magnetic tape cassette which has a longitudinal edge adjoining a pair of opposite broad sides each of which has a broad trapezoidal rib-like boss extending along said longitudinal edge, comprising a housing and a carrier slide in the housing, the housing and slide cooperatively defining an interior chamber having a shape similar to the shape of the cassette to confine the cassette in close fitting relation, spring means urging the slide out of the housing, locking means releasably holding the slide in the housing, the housing and slide cooperatively defining cassette-confining top and bottom walls to confront the broad sides of the cassette and also elongate front and back walls and side walls to substantially entirely close the cassette, the front wall being on the slide to form a closure for the open front of the housing, the slide being movable transversely of the front wall out of and into the housing, one of said top and bottom walls having an elongage opening adjacent to and extending along the front wall to receive the trapezoidal boss of the cassette and to accommodate movement of the cassette with the slide relative to the housing, the slide having side portions located beyond the ends of said opening, and guide means on the side portions of the slide and on adjacent portions of the housing to retain and guide the slide in predetermined orientation in the housing during sliding thereof and without interfering with the trapezoidal bosses of the cassette.

2. A container according to claim 1 in which the guide means are formed by side plates of the carrier slide and side walls of the housing.

3. A container according to claim 1 wherein the bottom wall is on the slide and has edge regions at the side portions of the carrier slide guided in grooves in the side walls of the housing.

4. A container according to claim 1 in which the side portions of the carrier slide has side plates with guide grooves into which ribs on the side walls of the housing engage.

5. A container according to claim 1 in which at least portions of said bottom wall are on the slide and located at the side portions of the slide, the housing having a base plate underlying the bottom wall of the slide to permit sliding movement thereof.

6. A container according to claim 1 wherein the bottom wall is on the carrier slide and has a downwardly stepped profile adjacent the front wall to define said opening, and the housing has a base plate with an opening adjacent the open front of the housing to receive the stepped profile of the bottom wall of the carrier slide.

7. A container according to claim 1 wherein the rear wall, top wall and two side walls are on the housing, and the bottom wall is on the carrier slide, both the bottom wall and the top wall having such elongate openings adjacent to and extending along the front wall to receive the tranperzoidal bosses of the cassette.

8. A container according to claim 1 in which the locking arrangement is manually releasable.

9. A container according to claim 1 wherein at least a portion of the bottom wall is on the carrier slide adjacent such side portions thereof, both the bottom and top walls having such elongate openings adjacent to and extending along the front wall and disposed opposite each other to receive the bosses of the cassette.

* * * * *